United States Patent
Lee et al.

(10) Patent No.: US 12,050,471 B2
(45) Date of Patent: Jul. 30, 2024

(54) MAP GENERATING SYSTEM FOR AUTONOMOUS MOVEMENT OF ROBOT AND METHOD THEREOF

(71) Applicants: Hyundai Motor Company, Seoul (KR); Kia Corporation, Seoul (KR)

(72) Inventors: Tae Young Lee, Gyeonggi-do (KR); Jun Yeong Choi, Seoul (KR); Ho Jun Ji, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 203 days.

(21) Appl. No.: 17/519,036

(22) Filed: Nov. 4, 2021

(65) Prior Publication Data

US 2022/0334589 A1  Oct. 20, 2022

(30) Foreign Application Priority Data

Apr. 14, 2021 (KR) .......................... 10-2021-0048519

(51) Int. Cl.
G05D 1/00 (2024.01)

(52) U.S. Cl.
CPC .......... G05D 1/0274 (2013.01); G05D 1/0238 (2013.01)

(58) Field of Classification Search
CPC .... G05D 1/0274; G05D 1/0238; G05D 1/024; G05D 1/028; G05D 1/0257; G01S 17/89; G06F 18/23213; G06F 18/25; G05B 15/02; G05B 19/042
See application file for complete search history.

(56) References Cited

U.S. PATENT DOCUMENTS

| | | | |
|---|---|---|---|
| 10,591,925 B2 | 3/2020 | Kim | |
| 11,348,269 B1* | 5/2022 | Ebrahimi Afrouzi | A47L 11/4025 |
| 2017/0243404 A1* | 8/2017 | Morales | G06T 7/60 |
| 2018/0113467 A1 | 4/2018 | Kim | |
| 2020/0200547 A1* | 6/2020 | Miller | G01C 21/3874 |
| 2021/0157330 A1* | 5/2021 | Tran | G06V 20/588 |
| 2021/0304491 A1* | 9/2021 | Caccin | G06T 7/55 |
| 2021/0405638 A1* | 12/2021 | Boyraz | G06V 20/64 |

FOREIGN PATENT DOCUMENTS

| | | |
|---|---|---|
| KR | 100772654 B1 | 11/2007 |
| KR | 101952414 B1 | 2/2019 |

* cited by examiner

*Primary Examiner* — Kenneth J Malkowski
*Assistant Examiner* — Carville Albert Hollingsworth, IV
(74) *Attorney, Agent, or Firm* — Fox Rothschild LLP

(57) ABSTRACT

A map generating system for autonomous movement of a robot includes a three-dimensional (3D) point cloud map input device, a 3D point cloud map regeneration device that extracts only 3D point cloud data corresponding to an arbitrary reference height from the 3D point cloud map to regenerate the 3D point cloud map, an unoccupied area generation device that extracts ground point cloud data from the 3D point cloud map to set an unoccupied area into which the robot is able to move, an occupied area generation device that extracts obstacle point cloud data from the 3D point cloud map to set an occupied area into which the robot is unable to move, and a two-dimensional (2D) map generation device that adds the unoccupied area and the occupied area to an area on the 3D point cloud map to generate a 2D map.

8 Claims, 8 Drawing Sheets

MAP GENERATING SYSTEM FOR AUTONOMOUS MOVEMENT OF ROBOT AND METHOD THEREOF

CROSS-REFERENCE TO RELATED APPLICATION

This application claims under 35 U.S.C. § 119(a) the benefit of Korean Patent Application No. 10-2021-0048519, filed in the Korean Intellectual Property Office on Apr. 14, 2021, the entire contents of which are incorporated herein by reference.

BACKGROUND

(a) Technical Field

The present disclosure relates to a map generating system for autonomous movement of a robot, more particularly, to the map generating system capable of generating a two-dimensional (2D) map used for autonomous movement of the robot, and a method thereof.

(b) Description of the Related Art

It is known to provide a robot that moves autonomously and performs scheduled tasks based on its own judgment using a map that provides obstacle information in a specified area and sensing values from various sensors provided in the robot, even without a manager's control for moving from place to place.

Such a robot moves while avoiding obstacles in a two-dimensional planar space, and often requires a two-dimensional map in which an area where the robot can move and an area with an obstacle are accurately mapped in the space for performing a task Accordingly, in the related art, a map was used in which only the 2D obstacle information obtained using an ultrasonic sensor is represented, or a map was used in which information about an obstacle having a passable height and an obstacle having an unpassable height for the obstacle using 3D obstacle information obtained by using a 3D camera sensor.

However, although the map for autonomous movement of a robot used in the related art as described above shows obstacle information for a plurality of heights, it is impossible to generate a map including height information of all obstacles in a corresponding area.

SUMMARY

An aspect of the present disclosure provides a map generation system and method for autonomous movement of a robot that enables simple and accurate generation of a two-dimensional map suitable for autonomous movement of a robot, wherein map generation system includes a map generating system for autonomous movement of a robot includes a three-dimensional (3D) point cloud map input device that receives a 3D point cloud map including 3D point cloud data obtained by sensing a ground of an area into which the robot is scheduled to move autonomously and an obstacle in the area, an unoccupied area generation device that extracts ground point cloud data from the 3D point cloud map and sets an area from which the ground point cloud data are extracted as an unoccupied area into which the robot is able to move, an occupied area generation device that extracts obstacle point cloud data from the 3D point cloud map and sets an area from which the obstacle point cloud data is extracted as an occupied area into which the robot is unable to move, and a two-dimensional (2D) map generation device that adds the unoccupied area and the occupied area to an area on the 3D point cloud map to generate a 2D map.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a map generating system for autonomous movement of a robot includes a three-dimensional (3D) point cloud map input device that receives a 3D point cloud map including 3D point cloud data obtained by sensing a ground of an area into which the robot is scheduled to move autonomously and an obstacle in the area, an unoccupied area generation device that extracts ground point cloud data from the 3D point cloud map and sets an area from which the ground point cloud data are extracted as an unoccupied area into which the robot is able to move, an occupied area generation device that extracts obstacle point cloud data from the 3D point cloud map and sets an area from which the obstacle point cloud data is extracted as an occupied area into which the robot is unable to move, and a two-dimensional (2D) map generation device that adds the unoccupied area and the occupied area to an area on the 3D point cloud map to generate a 2D map.

In addition, the map generating system may further include a 3D point cloud map regeneration device that extracts 3D point cloud data corresponding to an arbitrary reference height from the 3D point cloud map received from the 3D point cloud map input device, and regenerates the 3D point cloud map using the extracted 3D point cloud data.

In addition, the unoccupied area generation device may include a ground point cloud extraction device that extracts ground point cloud data from the 3D point cloud data forming the regenerated 3D point cloud map, and an unoccupied area allocation device that allocates the area from which the ground point cloud data is extracted as the unoccupied area in which the robot is moveable.

In addition, the unoccupied area generation device may further include a ground point cloud processing device that processes data to increase a density of the ground point cloud data.

In addition, the ground point cloud processing device may increase the density of the ground point cloud data by applying algorithms of dilation operation and erosion operation, which are morphological operations, to the ground point cloud data.

In addition, the occupied area generation device may include an obstacle point cloud extraction device that extracts obstacle point cloud data from the 3D point cloud data constituting the regenerated 3D point cloud map, and an occupied area allocation device that allocates an area from which the obstacle point cloud data are extracted as the occupied area into which the robot cannot move.

In addition, the occupied area generation device may further include a 2D projection device that projects the obstacle point cloud data including 3D data having height information on a 2D plane to convert the obstacle point cloud data into 2D data.

In addition, the 2D map generation device may initialize an entire corresponding area on the 3D point cloud map as an undefined unknown area, add the unoccupied area to the initialized unknown area at a position set by the unoccupied area generation device, and add the occupied area at a position set by the occupied area generation device to generate the 2D map to be utilized for the autonomous movement of the robot.

In addition, the 2D map generation device may assign a preferential status to the occupied area to set a corresponding area as the occupied area in an unknown area or an area which is set to allow the unoccupied area and the occupied to be overlapped. According to another aspect of the present disclosure, a map generating method for autonomous movement of a robot includes: receiving, by a three-dimensional (3D) point cloud map input device, a 3D point cloud map including 3D point cloud data obtained by sensing a ground of an area into which the robot is scheduled to move autonomously and an obstacle in the area; extracting, by an unoccupied area generation device, ground point cloud data from the 3D point cloud map to set an area from which the ground point cloud data are extracted as an unoccupied area into which the robot is able to move; extracting, by an occupied area generation device, obstacle point cloud data from the 3D point cloud map to set an area from which the obstacle point cloud data is extracted as an occupied area into which the robot is unable to move; and adding, by a two-dimensional (2D) map generation device, the unoccupied area and the occupied area to an area on the 3D point cloud map to generate a 2D map.

In addition, the map generating method may further include extracting 3D point cloud data corresponding to an arbitrary reference height from the 3D point cloud map received from the 3D point cloud map input device, and regenerating the 3D point cloud map using the extracted 3D point cloud data.

In addition, the extracting of the obstacle point cloud data may include extracting ground point cloud data from the 3D point cloud data forming the regenerated 3D point cloud map, and allocating the area from which the ground point cloud data is extracted as the unoccupied area in which the robot is moveable.

In addition, the extracting of the ground point cloud data may further include processing data to increase a density of the ground point cloud data.

In addition, the processing of the data may include increasing the density of the ground point cloud data by applying algorithms of dilation operation and erosion operation, which are morphological operations, to the ground point cloud data.

In addition, the extracting of the obstacle point cloud data may include extracting obstacle point cloud data from the 3D point cloud data constituting the regenerated 3D point cloud map, and allocating an area from which the obstacle point cloud data are extracted as the occupied area into which the robot cannot move.

In addition, the extracting of the obstacle point cloud data may further include projecting the obstacle point cloud data including 3D data having height information on a 2D plane to convert the obstacle point cloud data into 2D data.

In addition, the adding of the unoccupied area and the occupied area may include initializing an entire corresponding area on the 3D point cloud map as an undefined unknown area, adding the unoccupied area to the initialized unknown area at a position set by the unoccupied area generation device, and adding the occupied area at a position set by the occupied area generation device to generate the 2D map to be utilized for the autonomous movement of the robot.

In addition, the adding of the unoccupied area and the occupied area may include assigning a preferential status to the occupied area to set a corresponding area as the occupied area in an unknown area or an area in which the unoccupied area and the occupied area are overlapped.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
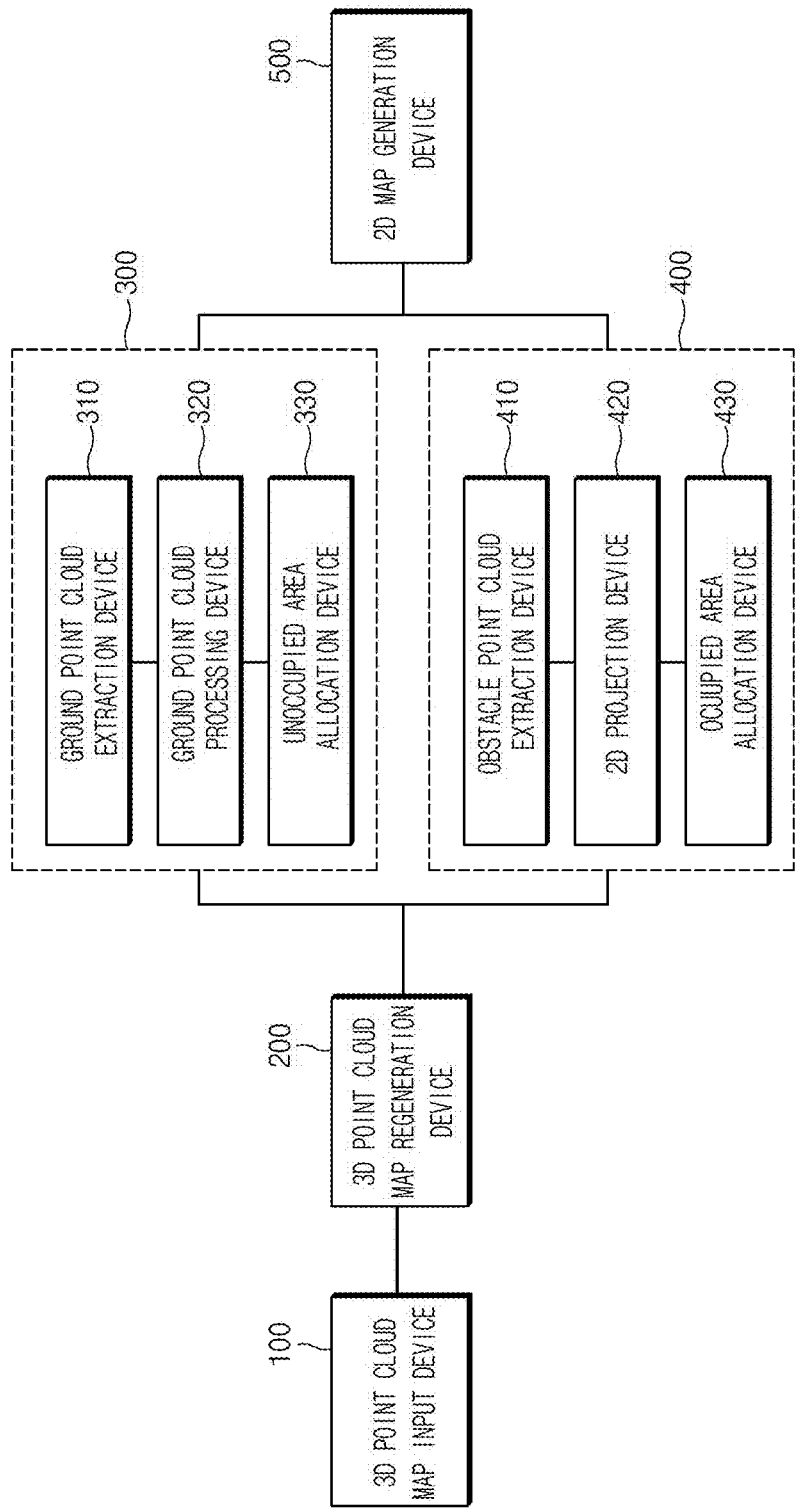
FIG. 1 is a block diagram illustrating of a map generating system for autonomous movement of a robot according to the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIGS. 1 to 3, embodiments of the present disclosure will be described in detail.

FIG. 1 is a block diagram illustrating of a map generating system for autonomous movement of a robot according to the present disclosure.

Referring to FIG. 1, a map generating system for autonomous movement of a robot according to the present disclosure may include a three-dimensional (3D) point cloud map input device 100 that receives a 3D point cloud map including 3D point cloud data obtained by sensing a ground of an area into which the robot is scheduled to move autonomously and an obstacle in the area, an unoccupied area generation device 300 that extracts ground point cloud data from the 3D point cloud map and sets an area from which the ground point cloud data are extracted as an unoccupied area into which the robot is able to move, an occupied area generation device 400 that extracts obstacle point cloud data from the 3D point cloud map and sets an area from which the obstacle point cloud data is extracted as an occupied area into which the robot is unable to move, and a 2D map generation device 500 that adds the unoccupied area and the occupied area to an area on the 3D point cloud map to generate a 2D map.

The 3D point cloud map input device 100 may receive and store the 3D point cloud map including the 3D point cloud data obtained by detecting the ground of the area to generate a 2D map for autonomous movement of the robot and the obstacles in the area.

In this case, the 3D point cloud map may be composed of 3D point cloud data including height information as well as planar location information for an area for generating a 2D map and points of all obstacles in the area.

The 3D point cloud data constituting the 3D point cloud map includes all height information of the obstacles obtained through various sensors, but in the case of a robot moving for autonomous movement, only information on the movable ground and obstacle information up to a height that may impede movement are required.

Accordingly, the map generating system may further include a 3D point cloud map regeneration device 200 that extracts 3D point cloud data corresponding to an arbitrary reference height from the 3D point cloud map received from the 3D point cloud map input device 100, and regenerates the 3D point cloud map using the extracted 3D point cloud data.

That is, the 3D point cloud map regeneration device 200 may extract only 3D point cloud data up to a preset reference height from among the 3D point cloud data constituting the 3D point cloud map, and regenerate new 3D point cloud map by using only the extracted 3D point cloud data.

As described above, in the 3D point cloud map regeneration device 200, by extracting only a part of the 3D point cloud data required for the 2D map and reducing the data for generating the 2D map, the data to be processed, at the unoccupied area generation device 300 and the occupied area generation device 400, by extracting the ground point cloud and the obstacle point cloud from the 3D point cloud data may be reduced. Accordingly, the data processing efficiency in generating the 2D map may be improved.

In this case, the reference height serving as a criterion for distinguishing the 3D point cloud data to be extracted by the 3D point cloud map regeneration device 200 and the 3D point cloud data not to be extracted is variously set according to the height of the robot to autonomously move.

In addition, when the height of the robot to autonomously move is changed, the 3D point cloud data extracted for 2D map generation may be changed only by changing the set value of the reference height. In addition, the 3D point cloud data extracted using the changed reference height may be utilized as a new 3D point cloud map for generating a 2D map suitable for autonomous movement of the robot.

In addition, the unoccupied area generation device 300 may include a ground point cloud extraction device 310 that extracts the ground point cloud data from the 3D point cloud data constituting the regenerated 3D point cloud map, and an unoccupied area allocation device 330 that allocates the area from which the ground point cloud data is extracted as an unoccupied area in which the robot can move.

In this case, the ground point cloud extraction device 310 may extract only the ground point cloud data corresponding to the ground from the 3D point cloud data. As described above, the flat area on the 2D map may be generated by using the extracted ground point cloud data as it is, but in this case, because the density of the ground point cloud data is not dense, the generated ground area may be distorted.

Accordingly, the unoccupied area generation device 300 may further include a ground point cloud processing device 320 that processes data to increase the density of the ground point cloud data. By processing the ground point cloud data by the ground point cloud processing device 320 to satisfy the resolution for generating the 2D map, the distortion that may appear on the 2D map may be minimized.

To this end, the ground point cloud processing device 320 may increase the density of the ground point cloud data by applying an algorithm of dilation operation and erosion operation, which are morphological operations, to the ground point cloud data.

The morphological operation is to process data forming an image while maintaining the overall structure using a unique structure or feature of an image, and typically includes a dilation operation and an erosion operation.

In this case, when the erosion operation is applied, an object forming the image may be reduced while maintaining the overall structure and shape of the image (i.e., point cloud data), the difference between the two objects may be made clear and noise may also be removed from the image.

When the dilation operation is applied, the image (i.e., point cloud data) may be enlarged to increase the density while filling an empty area such as a gap or a hole between the images.

Accordingly, the ground point cloud processing device 320 may fill the empty area between each ground point cloud data by applying the dilation and erosion operations which are the morphological calculations to the ground point cloud data, thereby minimizing distortion that may be generated when forming the ground area on the 2D map.

In addition, the unoccupied area allocation device 330 may allocate the area from which the ground point cloud data which is converted, in particular, to have a density that can minimize distortion even when converted to a plane of a 2D map by the ground point cloud processing device are extracted, as an unoccupied area. In this case, the unoccupied area, which is an empty area that is not occupied by an obstacle, represents an area in which the robot can autonomously move.

In addition, the occupied area generation device 400 may include an obstacle point cloud extraction device 410 that extracts obstacle point cloud data from the 3D point cloud data forming a regenerated 3D point cloud map, and an occupied area allocation device 430 that allocates an area from which the obstacle point cloud data are extracted as an occupied area in which the robot cannot move.

In this case, the obstacle point cloud extraction device 410 may extract only obstacle point cloud data corresponding to an obstacle from the 3D point cloud data. Because the obstacle point cloud data is matched together with height information, it may be difficult to express the obstacle point cloud data equally on the 2D map.

Accordingly, the occupied area generation device 400 may further include a 2D projection device 420 that projects the obstacle point cloud data including 3D data having height information on a 2D plane to convert the obstacle point cloud data into 2D data.

As described above, by converting the obstacle point cloud data into 2D data by the 2D projection device 420, it is possible to minimize the distortion that may be generated when the occupied area expected to collide by an obstacle during autonomous movement of the robot is formed on the 2D map.

In addition, the occupied area allocation device 430 may allocate an area from which the obstacle point cloud data is extracted, particularly, converted into the 2D data to minimize the distortion even when formed on the 2D map by the 2D projection device 420, as the occupied area. In this case, the occupied area, which is an area in which the robot cannot move because it is already occupied by an obstacle, represents an area in which a collision may be expected during autonomous movement of the robot.

In addition, the 2D map generation device 500 may initialize an entire corresponding area on the 3D point cloud map as an undefined unknown area, add the unoccupied area to the initialized unknown area at a position set by the unoccupied area generation device, and add the occupied area at a position set by the occupied area generation device to generate the 2D map that can be utilized for autonomous movement of the robot.

In this case, the 2D map generation device 500 may assign a preferential status to the occupied area to set a corresponding area as the occupied area in an unknown area or an area such as a boundary where the unoccupied area and the occupied area are overlapped.

FIGS. 2A to 2F are diagram illustrating an embodiment generating a 2D map for autonomous movement of a robot using a 3D point cloud map according to the present disclosure. Next, an embodiment of point cloud data processing for generating a 2D map by using a 3D point cloud map will be described with reference to FIGS. 2A to 2F.

Figure 2A:
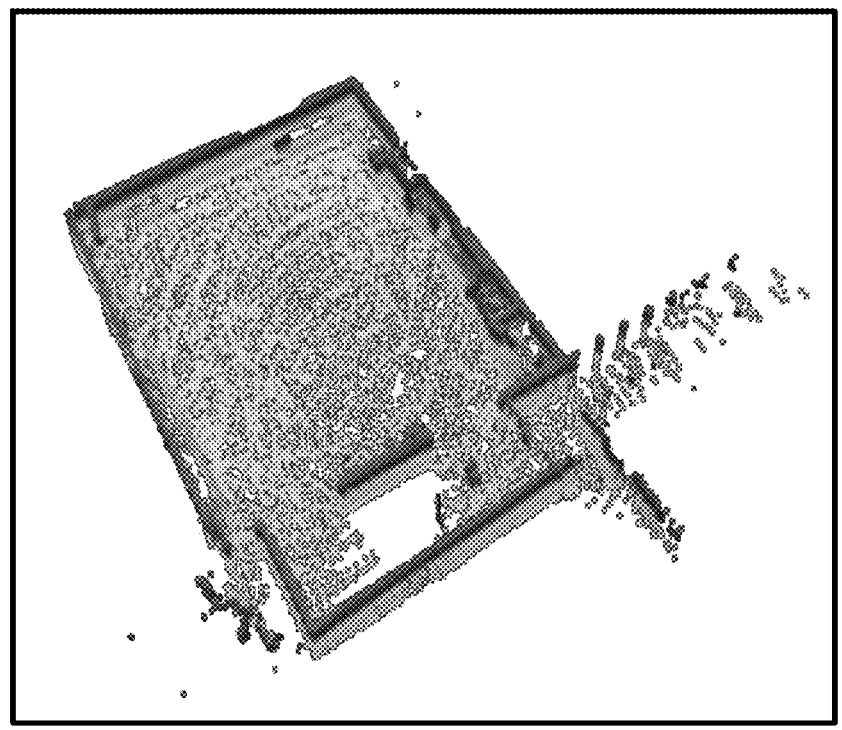
FIGS. 2A to 2F are diagram illustrating an embodiment generating a 2D map for autonomous movement of a robot using a 3D point cloud map according to the present disclosure.

First, as shown in FIG. 2A, the 3D point cloud map input device 100 receives and stores a 3D point cloud map including 3D point cloud data for an area in which autonomous movement of the robot is scheduled.

In this case, as shown in FIG. 2A, the 3D point cloud map includes a plurality of 3D point cloud points obtained through various sensors over the entire area including a substantially rectangular space. In FIG. 2A, the sensed 3D point cloud points are shown as a set of yellow-green points. In addition, the height information of the 3D point cloud points is indicated by different colors such as yellow green, blue, purple, and the like.

Thereafter, in the 3D point cloud map regeneration device 200, only 3D point cloud data for obstacles up to an arbitrary reference height required for movement of the robot may be extracted from the 3D point cloud data constituting the 3D point cloud map, and then, a new 3D point cloud map including the extracted 3D point cloud data may be regenerated.

As described, by excluding the 3D point cloud data for obstacles exceeding an arbitrary reference height by the 3D point cloud map regeneration device 200 from subsequent data processing, the efficiencies of ground point cloud data extraction, obstacle point cloud data extraction and data processing performed thereafter may be improved.

Figure 2B:
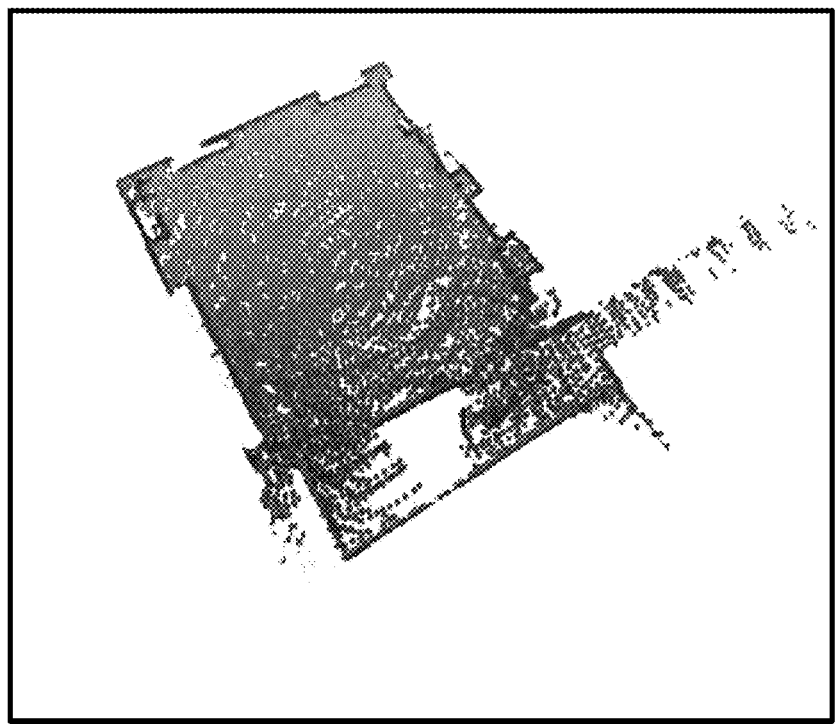
Figure 2C:
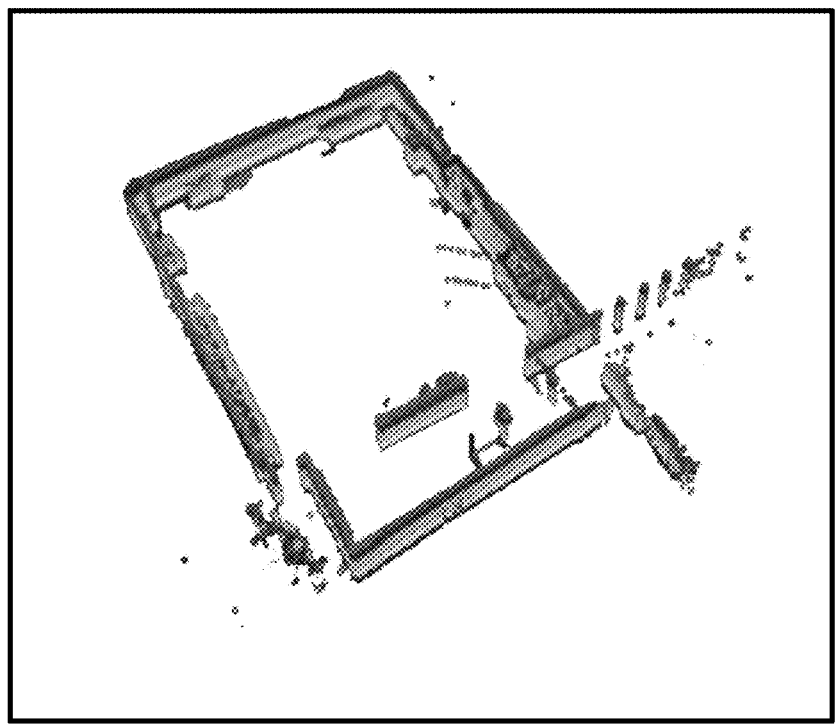

The ground point cloud extraction device 310 may extract the ground point cloud data from the regenerated 3D point cloud map as shown in FIG. 2B, and the obstacle point cloud extraction device 410 may extract the obstacle point cloud data from the regenerated 3D point cloud map as shown in FIG. 2C.

In FIG. 2B, the ground point cloud data are represented by blue dots, and in FIG. 2C, obstacles, which have heights that may interfere with the movement of the robot and include the boundary wall of the area where the robot may move, may be expressed in different colors according to the heights.

Figure 2D:
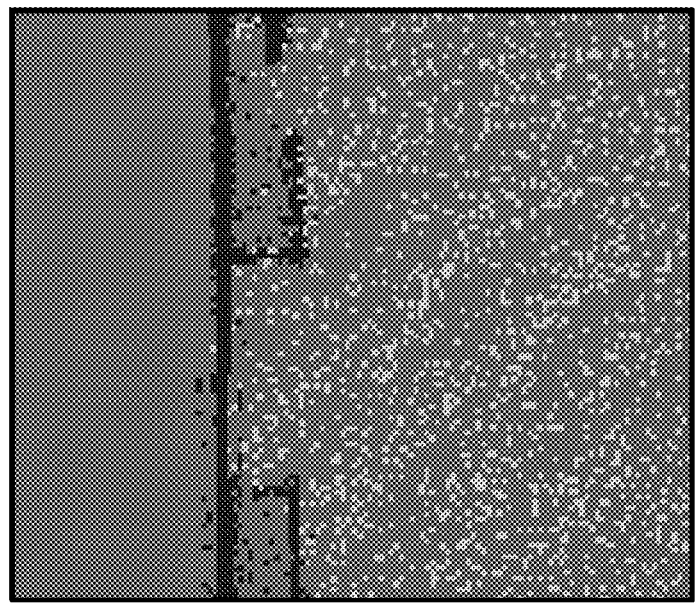

As described above, the ground point cloud data extracted by the ground point cloud extraction device 310 may not have a dense point cloud density as shown in FIG. 2D. In FIG. 2D, the light gray point cloud data is sparsely displayed on the dark gray floor, thereby indicating that the density of the ground point cloud data is not dense.

As described above, when a wide 2D plane is formed only with the ground point cloud data itself, which is not dense, a distortion of the 2D plane may be caused in the processing between the spaced point cloud data.

Figure 2E:
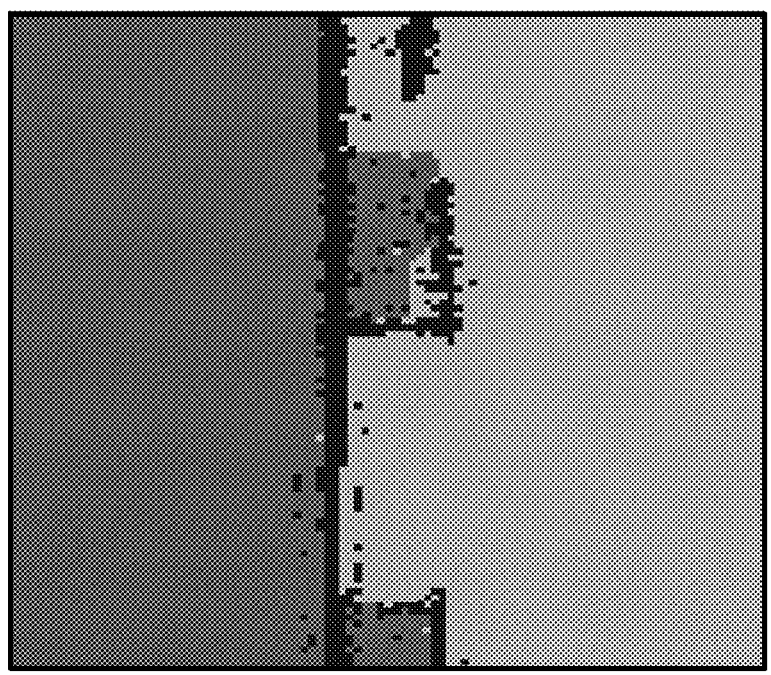

Accordingly, after the ground point cloud data is individualized by reducing the adjacent ground point cloud data by applying the dilation and erosion operations which are the morphological calculations to the ground point cloud data, the ground point cloud processing device 320 may expand the individualized ground point cloud data, thereby increasing the density while filling the gap between the point cloud data caused by being spaced apart from each other. By processing in the above manner, as shown in FIG. 2E, the dark gray background is densely filled with light gray ground point cloud data, thereby minimizing distortion when generating a 2D plane.

As described above, the unoccupied area allocation device 330 may allocate the area filled with ground point cloud data with increased density to the unoccupied area in which the robot may autonomously move.

Figure 2F:
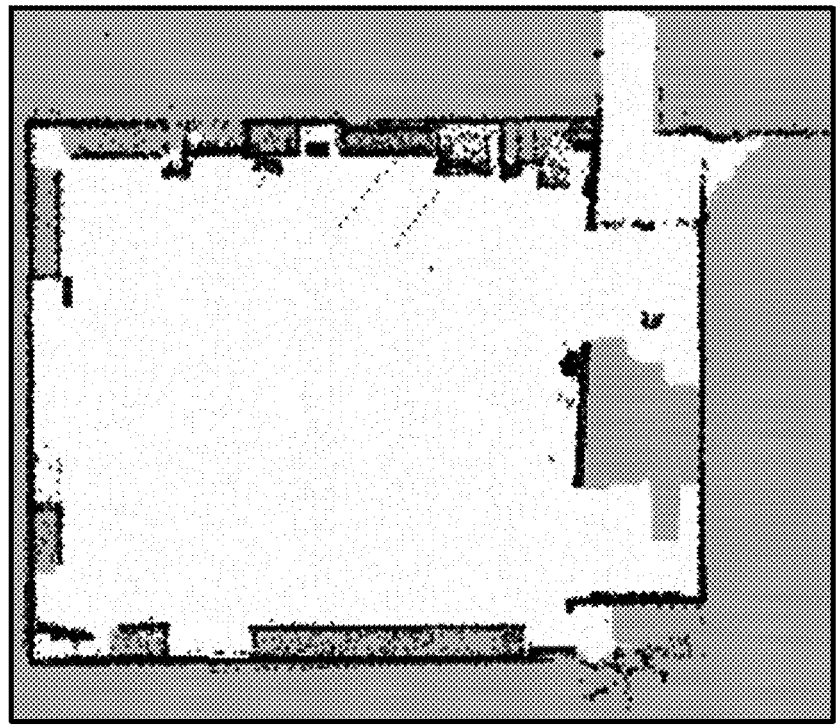

In addition, the 2D projection device 420 may project the obstacle point cloud data having height information on a 2D plane, so that all obstacles that interfere with the autonomous movement of the robot regardless of the actual heights of the obstacles may be expressed in the 2D plane as shown in FIG. 2F.

As described above, the occupied area allocation device 430 may allocate the area filled with the obstacle point cloud data projected on the 2D plane as the occupation area in which the autonomous movement of the robot is restricted.

In addition, first, the 2D map generation device 500 may initialize an unknown area in which the entire area for which a 2D map is to be generated by using the 3D point cloud map is unknown, and the unoccupied area allocation device may add the area which is allocated as an unoccupied area into which the robot is movable to the unknown area. In addition, the occupied area allocation device may add an area allocated as an occupied area in which the robot cannot move to the unknown area.

In this case, by giving preferential status to the occupied area, in the case of an area overlapping with the unknown or unoccupied area, the occupied area is allocated, thereby preventing damage or obstruction of movement by obstacles during autonomous movement of the robot.

Accordingly, as shown in FIG. 2F, it is possible to generate a 2D map that may be used for autonomous movement of a robot and provide height information for all obstacles having heights less than or equal to a preset reference height. In FIG. 2F, a 2D map with a resolution of about 5 cm is shown, where a gray area indicates an unknown area (that is, an area where 3D point cloud data is not obtained), a white area indicates an unoccupied area where the robot can move, and a black area indicates an area occupied by an obstacle that may obstruct the movement of a robot.

Figure 3:
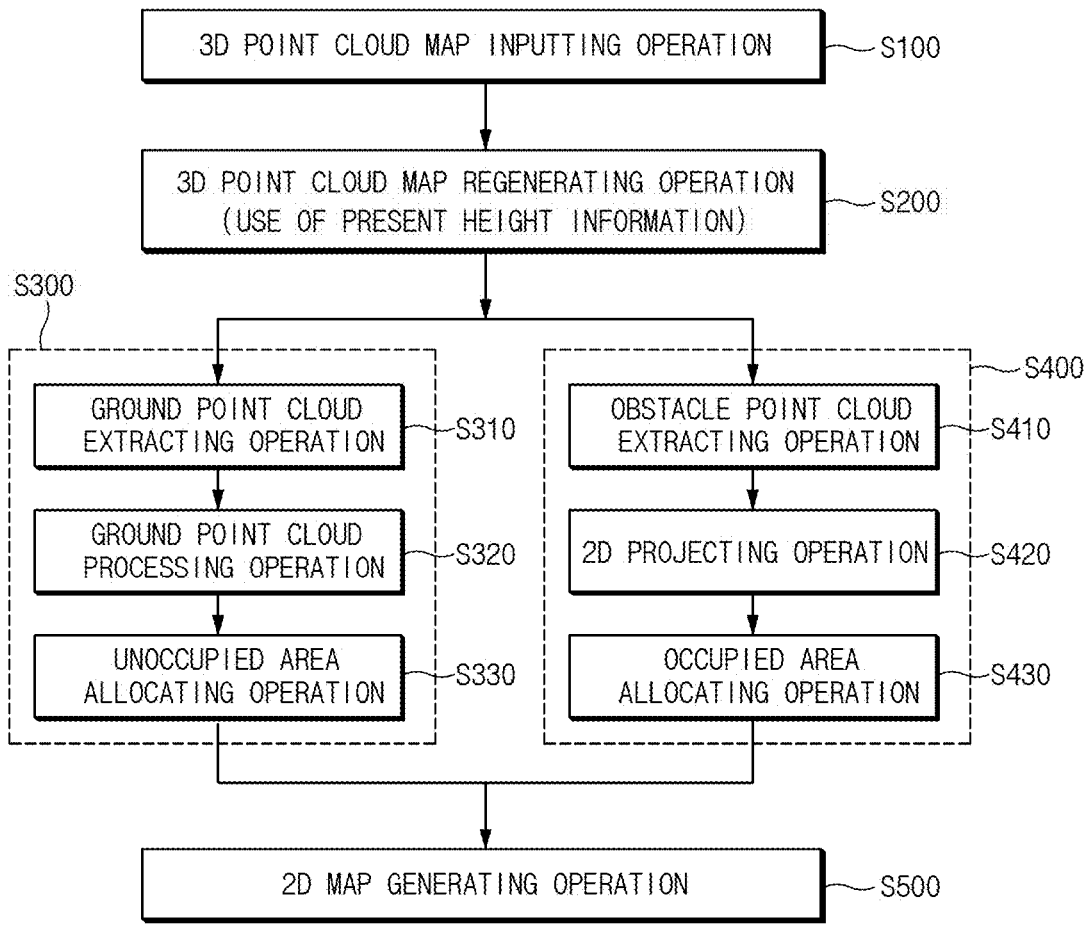
FIG. 3 is a flowchart illustrating a map generating method for autonomous movement of a robot according to the present disclosure.

FIG. 3 is a flowchart illustrating a map generating method for autonomous movement of a robot according to the present disclosure. Next, a map generation method for autonomous movement of a robot according to another embodiment of the present disclosure will be described with reference to FIG. 3.

Referring to FIG. 3, a map generating method for autonomous movement of a robot according to another embodiment of the present disclosure may include an 3D point cloud map inputting operation S100 of receiving a 3D point cloud map including 3D point cloud data obtained by sensing a ground of an area into which the robot is scheduled to move autonomously and an obstacle in the area, an unoccupied area generating operation S300 of extracting ground point cloud data from the 3D point cloud map and setting an area from which the ground point cloud data is extracted as an unoccupied area into which the robot is able to move, an occupied area generating operation S400 of extracting obstacle point cloud data from the 3D point cloud map and setting an area from which the obstacle point cloud data is extracted as an occupied area into which the robot is unable to move, and a 2D map generating operation S500 of adding the unoccupied area and the occupied area to an area on the 3D point cloud map to generate a 2D map.

In the 3D point cloud map inputting operation S100, the 3D point cloud map including the 3D point cloud data obtained by detecting the ground of the area to generate a 2D map for autonomous movement of the robot and the obstacles in the area may be received and stored.

The 3D point cloud data constituting the 3D point cloud map includes all height information of the obstacles obtained through various sensors, but in the case of a robot moving for autonomous movement, only information on the movable ground and obstacle information up to a height that may impede movement are required.

Accordingly, the map generating method may further include a 3D point cloud map regenerating operation S200 of extracting 3D point cloud data corresponding to an arbitrary reference height from the 3D point cloud map received from the 3D point cloud map input device 100, and regenerating the 3D point cloud map using the extracted 3D point cloud data.

That is, in the 3D point cloud map regenerating operation S200, only 3D point cloud data up to a preset reference height may be extracted from the 3D point cloud data constituting the 3D point cloud map, and a new 3D point cloud map may be regenerated by using only the extracted 3D point cloud data.

As described above, by extracting only a part of the 3D point cloud data required for the 2D map and reducing the data for generating the 2D map in the 3D point cloud map regenerating operation S200, the data to be processed in the unoccupied area generating operation S300 and the occupied area generating operation S400 may be reduced by extracting the ground point cloud and the obstacle point cloud from the 3D point cloud data.

In this case, the reference height serving as a criterion for distinguishing the 3D point cloud data to be extracted in the 3D point cloud map regenerating operation S200 and the 3D point cloud data not to be extracted is variously set according to the height of the robot to autonomously move.

In addition, when the height of the robot to autonomously move is changed, the 3D point cloud data extracted for 2D map generation may be changed only by changing the set value of the reference height. In addition, the 3D point cloud data extracted using the changed reference height may be utilized as a new 3D point cloud map for generating a 2D map suitable for autonomous movement of the robot.

In addition, the unoccupied area generating operation S300 may include a ground point cloud extracting operation S310 of extracting the ground point cloud data from the 3D point cloud data constituting the regenerated 3D point cloud map, and an unoccupied area allocating operation S330 of allocating the area from which the ground point cloud data is extracted as an unoccupied area in which the robot can move.

In this case, in the ground point cloud extracting operation S310, only the ground point cloud data corresponding to the ground from the 3D point cloud data may be extracted. As described above, the flat area on the 2D map may be generated by using the extracted ground point cloud data as it is, but in this case, because the density of the ground point cloud data is not dense, the generated ground area may be distorted.

Accordingly, the unoccupied area generating operation S300 may further include a ground point cloud processing operation S320 of processing data to increase the density of the ground point cloud data. By processing the ground point cloud data in the ground point cloud processing operation S320 to satisfy the resolution for generating the 2D map, the distortion that may appear on the 2D map may be minimized.

To this end, in the ground point cloud processing operation S320, the density of the ground point cloud data may be increased by applying an algorithm of dilation operation and erosion operation, which are morphological operations, to the ground point cloud data.

Accordingly, in the ground point cloud processing operation S320, the empty area between each ground point cloud data may be filled by applying the dilation and erosion operations which are the morphological calculations to the ground point cloud data, thereby minimizing distortion that may be generated when forming the ground area on the 2D map.

In addition, in the unoccupied area allocating operation S330, the area from which the ground point cloud data which is converted, in particular, to have a density that can minimize distortion even when converted to a plane of a 2D map by the ground point cloud processing device S320 are extracted may be allocated as an unoccupied area.

In addition, the occupied area generating operation S400 may include an obstacle point cloud extracting operation S410 of extracting obstacle point cloud data from the 3D point cloud data forming a regenerated 3D point cloud map, and an occupied area allocating operation S430 of allocating an area from which the obstacle point cloud data are extracted as an occupied area in which the robot cannot move.

In this case, in the obstacle point cloud extracting operation S410, only obstacle point cloud data corresponding to an obstacle may be extracted from the 3D point cloud data. Because the obstacle point cloud data is matched together with height information, it may be difficult to express the obstacle point cloud data equally on the 2D map.

Accordingly, the occupied area generating operation S400 may further include a 2D projecting operation S420 of projecting the obstacle point cloud data including 3D data having height information on a 2D plane to convert the obstacle point cloud data into 2D data.

As described above, by converting the obstacle point cloud data into 2D data in the 2D projecting operation S420, it is possible to minimize the distortion that may be generated when the occupied area expected to collide by an obstacle during autonomous movement of the robot is formed on the 2D map.

In addition, in the occupied area allocating operation S430, an area from which the obstacle point cloud data is extracted, particularly, converted into the 2D data to minimize the distortion even when formed on the 2D map by the 2D projection device 420 may be allocated as the occupied area.

In addition, in the 2D map generating operation S500, an entire corresponding area on the 3D point cloud map received in the 3D point cloud map inputting operation S100 or the 3D point cloud map regenerated in the 3D point cloud map regenerating operation S200 may be initialized as an undefined unknown area, the unoccupied area may be added to the initialized unknown area at a position set in the unoccupied area generating operation S300, and the occupied area may be added to a position set in the occupied area generating operation S400 to generate the 2D map that can be utilized for autonomous movement of the robot.

In this case, in the 2D map generating operation S500, a preferential status may be assigned to the occupied area to set a corresponding area as the occupied area in an unknown area or an area such as a boundary where the unoccupied area and the occupied area are overlapped.

As described above, according to the present disclosure, by using the 3D point cloud data of the already generated 3D point cloud map to generate a 2D map suitable for autonomous movement of a robot, a 2D map including all obstacle information according to height may be generated.

In addition, in generating a 2D map, the user may freely set the required reference height according to the size of the robot to move autonomously or the type of work, and the ground point cloud data or the obstacle point cloud data may be extracted and processed in a state that the 3D point cloud data higher than the set height are excluded, so that it is possible to easily create a 2D map suitable for autonomous movement of each robot. As a result, it is possible to reduce the hassle of creating a new map based on the information sensed one by one in the field where each robot needs to perform a task.

In addition, according to the present disclosure, although there were many difficulties in making a 2D map of the outdoor space by using the existing 2D lidar data, it is possible to improve the convenience of creating a 2D map for an outdoor space by generating a 2D map based on 3D point cloud data and improve the accuracy.

According to the present disclosure, by using the 3D point cloud data of the already generated 3D point cloud map to generate a 2D map suitable for autonomous movement of a robot, a 2D map including all obstacle information according to height may be generated.

In addition, according to the present disclosure, a user may freely set the required reference height according to the size of the robot to move autonomously or the type of work, and the ground point cloud data or the obstacle point cloud data may be extracted and processed in a state that the 3D point cloud data higher than the set height are excluded, so that it is possible to easily create a 2D map suitable for autonomous movement of each robot.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A map generating system for autonomous movement of a robot, the map generating system comprising:
    a plurality of sensors configured to obtain 3D point cloud data; and
    a processor configured to generate a 2D map from the 3D point cloud data,
    wherein the processor is configured to:
        receive a 3D point cloud map including the 3D point cloud data obtained by sensing, using the plurality of sensors, a ground of an area into which the robot is scheduled to move autonomously and sensing, by the plurality of sensors, an obstacle in the area;
        extract ground point cloud data from the 3D point cloud map and set an area from which the ground point cloud data are extracted as an unoccupied area into which the robot is able to move;
        extract obstacle point cloud data from the 3D point cloud map and set an area from which the obstacle point cloud data is extracted as an occupied area into which the robot is unable to move;
        add the unoccupied area and the occupied area to an area on the 3D point cloud map to generate the 2D map;
        increase a density of the ground point cloud data by applying morphological operations including dilation and erosion to the ground point cloud data, such that a gap between the ground point cloud data is filled with additional ground point cloud data;
        extract 3D point cloud data corresponding to an arbitrary reference height from the 3D point cloud map, and regenerate the 3D point cloud map using the extracted 3D point cloud data;

initialize an entire corresponding area on the 3D point cloud map as an undefined unknown area, add the unoccupied area to the initialized unknown area, and add the occupied area to generate the 2D map to be utilized for the autonomous movement of the robot; and set an overlapping area as the occupied area in an unknown area, wherein the overlapping area is an area in which the unknown area, the unoccupied area, and the occupied area overlap.

2. The map generating system of claim 1, wherein the processor is further configured to:

extract ground point cloud data from the 3D point cloud data forming the regenerated 3D point cloud map; and allocate the area from which the ground point cloud data is extracted as the unoccupied area in which the robot is moveable.

3. The map generating system of claim 1, wherein the processor is further configured to:

extract obstacle point cloud data from the 3D point cloud data constituting the regenerated 3D point cloud map; and allocate an area from which the obstacle point cloud data are extracted as the occupied area into which the robot cannot move.

4. The map generating system of claim 3, wherein the processor is further configured to:

project the obstacle point cloud data including 3D data having height information on a 2D plane to convert the obstacle point cloud data into 2D data.

5. A map generating method for autonomous movement of a robot, the map generating method comprising:

sensing, by a plurality of sensors, a ground of an area into which the robot is scheduled to move autonomously and an obstacle in the area;

receiving, by a processor, a 3D point cloud map including 3D point cloud data obtained by sensing the ground of the area into which the robot is scheduled to move autonomously and the obstacle in the area;

extracting, by the processor, ground point cloud data from the 3D point cloud map to set an area from which the ground point cloud data are extracted as an unoccupied area into which the robot is able to move;

extracting, by the processor, obstacle point cloud data from the 3D point cloud map to set an area from which the obstacle point cloud data is extracted as an occupied area into which the robot is unable to move;

adding, by the processor, the unoccupied area and the occupied area to an area on the 3D point cloud map to generate a 2D map;

increasing, by the processor, a density of the ground point cloud data by applying morphological operations including dilation and erosion to the ground point cloud data, such that a gap between the ground point cloud data is filled with additional ground point cloud data; and extracting 3D point cloud data corresponding to an arbitrary reference height from the 3D point cloud map received from the 3D point cloud map input device, and regenerating the 3D point cloud map using the extracted 3D point cloud data, wherein the adding of the unoccupied area and the occupied area includes:

initializing an entire corresponding area on the 3D point cloud map as an undefined unknown area, adding the unoccupied area to the initialized unknown area at a position set by the unoccupied area generation device, and adding the occupied area at a position set by the occupied area generation device to generate the 2D map to be utilized for the autonomous movement of the robot; and setting an overlapping area as the occupied area, wherein the overlapping area is an area where the unknown area, the unoccupied area, and the occupied area overlap.

6. The map generating method of claim 5, wherein the extracting of the ground point cloud data includes:

extracting ground point cloud data from the 3D point cloud data forming the regenerated 3D point cloud map; and allocating the area from which the ground point cloud data is extracted as the unoccupied area in which the robot is moveable.

7. The map generating method of claim 5, wherein the extracting of the obstacle point cloud data includes:

extracting obstacle point cloud data from the 3D point cloud data constituting the regenerated 3D point cloud map; and allocating an area from which the obstacle point cloud data are extracted as the occupied area into which the robot cannot move.

8. The map generating method of claim 7, wherein the extracting of the obstacle point cloud data further includes:

projecting the obstacle point cloud data including 3D data having height information on a 2D plane to convert the obstacle point cloud data into 2D data.

* * * * *